(12) United States Patent
Shi

(10) Patent No.: US 11,121,829 B2
(45) Date of Patent: Sep. 14, 2021

(54) METHOD AND DEVICE FOR RETRANSMISSION PROCESSING

(71) Applicant: GUANGDONG OPPO MOBILE TELECOMMUNICATIONS CORP., LTD., Guangdong (CN)

(72) Inventor: Cong Shi, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 247 days.

(21) Appl. No.: 16/342,411

(22) PCT Filed: Mar. 23, 2018

(86) PCT No.: PCT/CN2018/080288
§ 371 (c)(1),
(2) Date: Apr. 16, 2019

(87) PCT Pub. No.: WO2019/178854
PCT Pub. Date: Sep. 26, 2019

(65) Prior Publication Data
US 2021/0075548 A1    Mar. 11, 2021

(51) Int. Cl.
*H04L 1/18* (2006.01)
*H04W 80/02* (2009.01)
*H04L 1/16* (2006.01)

(52) U.S. Cl.
CPC .......... *H04L 1/188* (2013.01); *H04L 1/1642* (2013.01); *H04L 1/1685* (2013.01);
(Continued)

(58) Field of Classification Search
None
See application file for complete search history.

(56) References Cited

U.S. PATENT DOCUMENTS

| 8,401,017 B2 | 3/2013 | Wang |
| 8,537,684 B2 | 9/2013 | Kubota |

(Continued)

FOREIGN PATENT DOCUMENTS

| CN | 1889414 A | 1/2007 |
| CN | 101489252 A | 7/2009 |

(Continued)

OTHER PUBLICATIONS

Huawei, HiSilicon; "Remaining issues of POLL mechanism"; 3GPP TSG-RAN WG2 #101, R2-1801822; Mar. 2, 2018.

(Continued)

*Primary Examiner* — Ajit Patel
(74) *Attorney, Agent, or Firm* — Ladas & Parry, LLP

(57) ABSTRACT

A method and device for retransmission processing are provided. The method includes that: a transmission side transmits a detection indication to a receiving side, the detection indication being used to indicate the receiving side to feed back a receiving state of multiple Acknowledged Mode Data (AMD) Protocol Data Units (PDU) sent by the transmission side; the transmission side receives a state report sent by the receiving side, the state report being used to indicate a receiving state of at least one AMD PDU in the multiple AMD PDUs; and if a Sequence Number (SN) of a first AMD PDU of the at least one AMD PDU is equal to a first value, the transmission side stops transmitting the detection indication for the multiple AMD PDUs to the receiving side, the first value being less than or equal to a maximum SN in the SNs of the multiple AMD PDUs. The method and device of the embodiments of the present application are advantageous in reducing unnecessary overhead.

11 Claims, 3 Drawing Sheets

(52) U.S. Cl.
CPC .......... *H04L 1/1835* (2013.01); *H04L 1/1858* (2013.01); *H04W 80/02* (2013.01)

(56) References Cited

U.S. PATENT DOCUMENTS

| | | | |
|---|---|---|---|
| 2003/0099305 | A1 | 5/2003 | Yi |
| 2006/0056441 | A1 | 3/2006 | Jiang |
| 2006/0062323 | A1 | 3/2006 | Yi |
| 2007/0047452 | A1* | 3/2007 | Lohr ............ H04L 1/1829 370/242 |
| 2008/0144598 | A1 | 6/2008 | Jiang |
| 2008/0198869 | A1 | 8/2008 | Jiang |
| 2008/0205371 | A1 | 8/2008 | Jiang |
| 2008/0205372 | A1 | 8/2008 | Jiang |
| 2008/0212605 | A1 | 9/2008 | Jiang |
| 2009/0175206 | A1 | 7/2009 | Wang |
| 2013/0039192 | A1 | 2/2013 | Kubota |
| 2013/0039269 | A1 | 2/2013 | Kubota |
| 2014/0050096 | A1* | 2/2014 | Cui ............. H04L 1/1867 370/236 |
| 2014/0219236 | A1* | 8/2014 | Uchino ........ H04W 28/0205 370/329 |
| 2014/0254528 | A1* | 9/2014 | Quan ........... H04L 5/0055 370/329 |
| 2017/0099128 | A1* | 4/2017 | Gao ............. H04L 1/1867 |
| 2020/0059324 | A1* | 2/2020 | Martin ......... H04L 1/1874 |

FOREIGN PATENT DOCUMENTS

| | | | |
|---|---|---|---|
| CN | 101675630 | A | 3/2010 |
| CN | 101925195 | A | 12/2010 |
| CN | 101944984 | A | 1/2011 |
| CN | 106233811 | A | 12/2016 |
| CN | 107294652 | A | 10/2017 |
| EP | 1315341 | A1 | 5/2003 |
| EP | 1973261 | A2 | 9/2008 |
| GB | 2491050 | A | 11/2012 |
| WO | 2017088696 | A1 | 6/2017 |

OTHER PUBLICATIONS

Sharp, MediaTek Inc. "Issue on POLL_SN value mismatch"; 3GPP TSG-RAN WG2 NR AH-1801, R2-1800563; Jan. 26, 2018.

International Search Report in the international application No. PCT/CN2018/080288, dated Oct. 8, 2018.

First Office Action of the Chinese application No. 201880003565.1, dated Nov. 26, 2019.

International Search Report in international application No. PCT/CN2018/080288, dated Oct. 8, 2018 with translation provided by Google translate.

Written Opinion of the International Search Authority in international application No. PCT/CN2018/080288, dated Oct. 8, 2018 with translation provided by Google translate.

Supplementary European Search Report in the European application No. 18849395.1, dated Feb. 28, 2020.

Notice of Rejection of the Chinese application No. 201880003565.1, dated Mar. 13, 2020.

Second Office Action of the Chinese application No. 201880003565.1, dated Jan. 7, 2020.

Written Opinion of the International Search Authority in the international application No. PCT/CN2018/080288, dated Oct. 8, 2018.

First Office Action of the European application No. 18849395.1, dated Dec. 15, 2020.

* cited by examiner

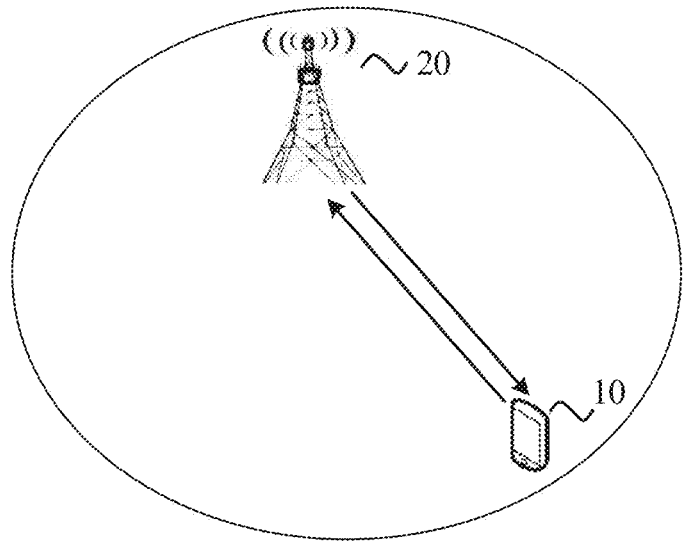

A transmission side transmits a detection indication to a receiving side for indicating the receiving side to feed back a receiving state of multiple AMD PDUs sent by the transmission side ~110

The transmission side receives a state report sent by the receiving side, the state report indicating a receiving state of at least one AMD PDU of the multiple AMD PDUs ~120

If an SN of a first AMD PDU of the at least one AMD PDU is equal to a first value, the transmission side stops transmitting the detection indication for the multiple AMD PDUs to the receiving side, the first value being less than or equal to a maximum SN in the SNs of the multiple AMD PDUs ~130

FIG. 2

METHOD AND DEVICE FOR RETRANSMISSION PROCESSING

CROSS-REFERENCE TO RELATED APPLICATION

The present application is the U.S. national phase application of PCT Application No. PCT/CN2018/080288 filed on Mar. 23, 2018, the disclosure of which is incorporated herein in its entirety by reference.

TECHNICAL FIELD

Embodiments of the present disclosure relate to the field of communications, and in particular, to a method and device for retransmission processing.

BACKGROUND

In the existing protocol, in a Radio Link Control (RLC) Acknowledged Mode (AM), a transmission side may trigger a receiving side to report a state report by using a polling mechanism. Therefore, the transmission side may know which Acknowledged Mode Data (AMD) Protocol Data Unit (PDU) is correctly received and which is not received correctly.

The transmission side may carry a detection indication in a packet header of a certain AMD PDU. When the receiving side receives the AMD PDU with the detection indication, if a certain condition is satisfied, the receiving side feeds back a state report to the transmission side.

After the transmission side adds a detection indication to an AMD PDU, the transmission side maintains a parameter value. When the transmission side receives a state report sent by the receiving side, it may be confirmed whether the state report includes a receiving situation of the AMD PDU where a Sequence Number (SN) is equal to the parameter value, if not, a detection retransmission timer continues to be maintained, that is, it may continue to query the receiving side for the receiving situation of the previously sent AMD PDU. In a New Radio (NR) system, due to the pre-processing situation, it is very likely that the transmission side will repeatedly poll for the previous AMD PDU within a period of time, resulting in unnecessary overhead.

SUMMARY

In view of this, the present disclosure provides a method and device for retransmission processing, advantageous in reducing unnecessary overhead.

According to a first aspect, a method for retransmission processing is provided, which may include that: a transmission side transmits a detection indication to a receiving side, wherein the detection indication is used to indicate the receiving side to feed back a receiving situation of multiple AMD PDUs sent by the transmission side; the transmission side receives a state report sent by the receiving side, the state report being used to indicate a receiving situation of at least one AMD PDU in the multiple AMD PDUs; and if an SN of a first AMD PDU of the at least one AMD PDU is equal to a first value, the transmission side stops transmitting the detection indication for the multiple AMD PDUs to the receiving side, wherein the first value is less than or equal to a maximum SN in the SNs of the multiple AMD PDUs.

In a possible implementation, a packet header of a second AMD PDU in the multiple AMD PDUs may include the detection indication.

In a possible implementation, the first value may be equal to the maximum SN, or the first value may be equal to an SN of the second AMD PDU.

In a possible implementation, the method may further include that: after the transmission side delivers the second AMD PDU from an RLC layer to a Media Access Control (MAC) layer, the transmission side starts or restarts a detection retransmission tinier.

In a possible implementation, the step that the transmission side stops transmitting the detection indication for the multiple AMD PDUs to the receiving side may include that: the transmission side stops and resets the detection retransmission timer.

In a possible implementation, the method may further include that: if the SN of each of the at least one AMD PDU is not equal to the first value, the transmission side continues to transmit the detection indication for the multiple AMD PDUs to the receiving side for a duration of the detection retransmission timer.

In a possible implementation, the method may further include that: when the detection retransmission timer expires, the transmission side retransmits all AMD PDUs not fed back in the multiple AMD PDUs according to the received state report.

In a possible implementation, the multiple AMD PDUs may be transmitted by a first RLC layer of the transmission side, and the step that the transmission side retransmits all AMD PDUs not fed back in the multiple AMD PDUs may include that: when a buffer of the first RLC layer is empty, or a Packet Data Convergence Protocol (PDCP) layer of the transmission side has no data transmission, or the PDCP layer has data transmission but the PDCP layer switches from the first RLC layer to a second RLC layer, the transmission side retransmits all AMD PDUs not fed hack in the multiple AMD PDUs according to the received state report.

In a possible implementation, the transmission side may be a terminal device or a network device.

According to a second aspect, a device is provided, which may be configured to perform the method in the first aspect or any possible implementations of the first aspect. Specifically, the device may include a unit for performing the method in the first aspect or any possible implementation of the first aspect.

According to a third aspect, a device is provided, which may include: a memory, a processor, an input interface, and an output interface. The memory, the processor, the input interface and the output interface may be connected by a bus system. The memory may be configured to store an instruction, and the processor may be configured to execute the instruction stored in the memory to perform the method in the first aspect or any possible implementation of the first aspect.

According to a fourth aspect, a computer storage medium is provided, which may be configured to store a computer software instruction for performing the method in the first aspect or any possible implementation of the first aspect, the computer software instruction including a program designed for the above aspects.

According to a fifth aspect, a computer program product including an instruction is provided, which may enable, when run on a computer, the computer to perform the method in the first aspect or any possible implementation of the first aspect.

These and other aspects of the present disclosure will be more readily apparent from the following description of the embodiments.

BRIEF DESCRIPTION OF DRAWINGS

FIG. 1 is a schematic diagram of an application scenario according to an embodiment of the present disclosure.

FIG. 2 is a schematic block diagram of a method for retransmission processing according to an embodiment of the present disclosure.

DETAILED DESCRIPTION

Figure 3:
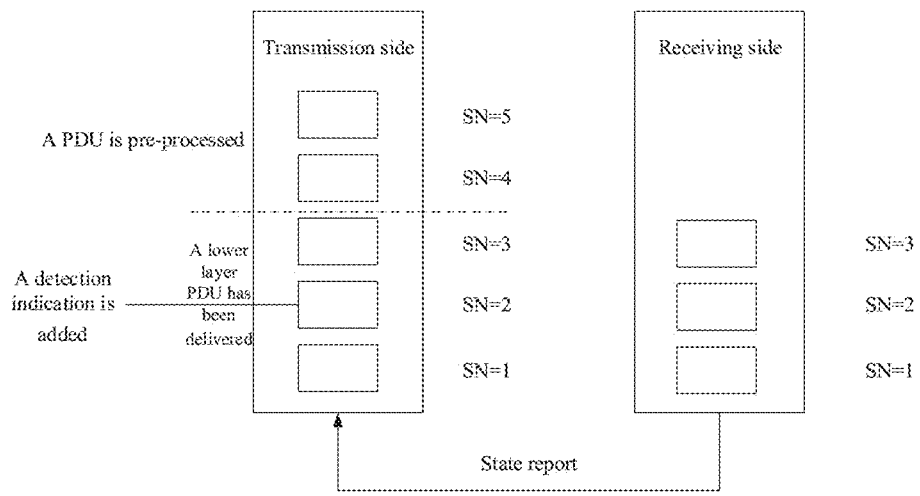
FIG. 3 is another schematic block diagram of a method for retransmission processing according to an embodiment of the present disclosure.

The technical solutions in the embodiments of the present disclosure are clearly and completely described in the following with reference to the accompanying drawings in the embodiments of the present disclosure.

It is to be understood that the technical solutions of the embodiments of the present disclosure may be applied to various communication systems such as a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), or a Worldwide Interoperability for Microwave Access (WiMAX) communication system, an NR system, or a future 5G system.

In particular, the technical solutions of the embodiments of the present disclosure may be applied to various communication systems based on non-orthogonal multiple access technologies, such as a Sparse Code Multiple Access (SCMA) system, and a Low Density Signature (LDS) system, etc., of course, the SCMA system and the LDS system may also be referred to as other names in the communication field; further, the technical solutions of the embodiments of the present disclosure may be applied to a multi-carrier transmission system using a non-orthogonal multiple access technology such as an Orthogonal Frequency Division Multiplexing (OFDM) using a non-orthogonal multiple access technology, a Filter Bank Multi-Carrier (FBMC), a Generalized Frequency Division Multiplexing (GFDM), or a Filtered-OFDM (F-OFDM) system, etc.

In the embodiments of the present disclosure, the terminal device may refer to a User Equipment (UE), an access terminal, a user unit, a user station, a mobile radio station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing devices connected to a wireless modem, an in-vehicle device, a wearable device, a terminal device in a future 5G network, or a terminal device in a future evolved Public Land Mobile Network (PLMN), which is not limited in the embodiments of the present disclosure.

A network device in the embodiments of the present disclosure may be a device for communicating with a terminal device. The network device may be a Base Transceiver Station (BTS) in a GSM or a CDMA, or a NodeB (NB) in a WCDMA system, or an Evolutional NodeB (eNB or eNodeB) in an LTE system, or a wireless controller in a Cloud Radio Access Network (CRAN) scenario. Or, the network device may be a relay station, an access point, an in-vehicle device, a wearable device, and a network device in a future 5G network or a network device in a future evolved PLMN, which is not limited in the embodiments of the present disclosure.

FIG. 1 is a schematic diagram of an application scenario according to an embodiment of the present disclosure. A communication system in FIG. 1 may include a terminal device 10 and a network device 20. The network device 20 is configured to provide communication services for the terminal device 10 and accesses the core network. The terminal device 10 accesses a network by searching for synchronization signals, broadcast signals and the like sent by the network device 20, thereby performing communication with the network. The arrows illustrated in FIG. 1 may represent uplink/downlink transmissions by a cellular link between the terminal device 10 and the network device 20.

It is to be understood that the transmission side involved in the embodiments of the present disclosure may be a terminal device or a network device. That is, the terminal device may transmit an AMD PDU to the network device, and the network device feeds back a state report to the terminal device; or the network device transmits an AMD PDU to the terminal device, and the terminal device feeds back a state report to the network device.

In a current protocol, the transmission side may carry a detection indication in a packet header of a certain AMD PDU. When the receiving side receives the AMD PDU with the detection indication, if a certain condition is satisfied, the receiving side feeds back a state report to the transmission side. After the transmission side adds a detection indication to an AMD PDU, the transmission side maintains a parameter value. When the transmission side receives a state report sent by the receiving side, it may be confirmed whether the state report includes a receiving situation of the AMD PDU where an SN is equal to the parameter value, if not, a detection retransmission timer continues to be maintained, that is, when the timer expires, it may continue to query the receiving side for the receiving situation of the previously sent AMD PDU.

In the NR system, due to the pre-processing situation, a PDCP may be pre-delivered to an RLC in advance. In other words, the transmission side may transmit three AMD PDUs at a time, and the transmission side also delivers, in addition to delivering the three AMD PDUs from the RLC layer to an MAC, two other AMD PDUs from the RLC to the MAC. At this time, a parameter (Tx-NEXT) is maintained at the transmission side, and the parameter value is the sum of the number of AMD PDUs delivered by the current RLC layer and the number of pre-processed AMD PDUs, that is, the parameter value is Tx-NEXT=6. At this time, the transmission side also maintains a second parameter value POLL_SN, and sets the value of POLL_SN to the value of Tx-NEXT, that is, POLL_SN=6. Assuming that a detection indication is added to an AMD PDU with SN=2, after the transmission side transmits the AMD PDUs with SN=1, 2, and 3 to the receiving side, a state report received by the transmission side does not include the receiving situation of the AMD PDU with SN=6 anyway, because the AMD PDU with SN=6 is still in the unsent state. In this case, the transmission side is likely to always transmit a detection indication to the receiving side, resulting in unnecessary overhead. After a certain time, the transmission side may further retransmit to the receiving side according to the feedback situation of the state report.

FIG. 2 is a schematic block diagram of a method for retransmission processing 100 according to an embodiment of the present disclosure. As illustrated in FIG. 2, the method 100 includes part or all of the following contents.

At S110, a transmission side transmits a detection indication to a receiving side, the detection indication being used to indicate the receiving side to feed back a receiving state of multiple AMD PDUs sent by the transmission side.

At S120, the transmission side receives a state report sent by the receiving side, the state report being used to indicate a receiving state of at least one AMD PDU in the multiple AMD PDUs.

At S130, if an SN of a first AMD PDU of the at least one AMD PDU is equal to a first value, the transmission side stops transmitting the detection indication for the multiple AMD PDUs to the receiving side, the first value being less than or equal to a maximum SN in the SNs of the multiple AMD PDUs.

For example, as illustrated in FIG. 3, the transmission side has already delivered the AMD PDU with SN=1, 2, 3 from the RLC to the MAC layer, and the RLC layer has two pre-processed AMD PDUs with SN=5, 6, Tx-NEXT=6. The AMD PDU with SN=2 carries a detection indication. In this case, the transmission side may set POLL_SN to a value less than or equal to 3. For example, POLL_SN may be set to a maximum SN of the AMD PDU sent by the transmission side, that is, 3. For example, POLL_SN may be set to an SN carrying the detection indication in the AMD PDU sent by the transmission side, that is, 2. In this case, the transmission side determines, according to the SN and POLL_SN carried in the received state report, whether to stop continuously transmitting the detection indication for the AMD PDU with SN=1, 2, and 3 to the receiving side. It is assumed that the state report carries SN=1, 2, 3, and no matter whether POLL_SN is 2 or 3, the transmission side may stop continuously transmitting the detection indication for the AMD PDU with SN=1, 2, 3 to the receiving side.

Therefore, the method for retransmission processing of the embodiment of the present disclosure is advantageous in reducing unnecessary overhead.

Optionally, in the embodiments of the present disclosure, POLL_SN may be a maximum SN in SNs of multiple AMD PDUs sent by the transmission side, as illustrated in FIG. 3, POLL_SN=3, or POLL_SN may be an SN of an AMD PDU carrying a detection indication in multiple AMD PDUs sent by the transmission side, as illustrated in FIG. 3, POLL_SN=2. It is to be understood that the embodiments of the present disclosure are not limited to the case where POLL_SN is equal to the maximum SN and the SN of the AMD PDU carrying the detection indication.

Optionally, in the embodiments of the present disclosure, the transmission side may carry the detection indication in a packet header of a certain AMD PDU. Specifically, carrying of the detection indication in which AMD PDU may be selected in the following two manners. First, the network device may configure two parameters pollPDU and pollbyte, and maintain two count values of PDU_WITHOUT_POLL and BYTE_WITHOUT_POLL, when the two count values are respectively greater than a value configured by the network device (that is, PDU_WITHOUT_POLL>pollPDU, and BYTE_WITHOUT_POLL>pollbyte), a detection indication is added to the current AMD PDU. Second, if the current AMD PDU is the last upper layer packet, or a transmission buffer is emptied, a detection indication is added to the current AMD PDU.

Optionally, in the embodiments of the present disclosure, the method further includes that: after the transmission side delivers the second AMD PDU from an RLC layer to an MAC layer, starting or restarting, by the transmission side, a detection retransmission timer.

That is, after the transmission side initially transmits multiple AMD PDUs to the receiving side, the transmission side may start or restart the detection retransmission timer. Specifically, the transmission side may deliver an AMD PDU carrying a detection indication from the RLC layer to the MAC layer, and Tx-NEXT is also updated in this case. If the detection retransmission timer is not timing, the transmission side may start the detection retransmission timer; if the detection retransmission timer is already timing, the detection retransmission timer may be restarted.

Optionally, in the embodiments of the present disclosure, the step that the transmission side stops transmitting the detection indication for the multiple AMD PDUs to the receiving side includes that: the transmission side stops and resets the detection retransmission timer.

If the state report fed back by the receiving side to the transmission side carries an SN equal to POLL_SN, the transmission side may stop the foregoing detection retransmission timer and reset the detection retransmission timer. When the transmission side stops the detection retransmission timer, the transmission side may retransmit the AMD PDUs that failed to receive according to the receiving situation of the AMD PDU included in the state report.

Here it is necessary to emphasize the difference between reset and restart. The so-called timer restart is to start timing from the beginning. The duration of this timer is the same as the duration of the timer that was started previously. The timer reset is to reset the duration of the timer. At this time, it is not necessary to start the timer. The timer is started only when there is a start operation, and the duration of the started timer is likely to be different from the duration of the timer that was started previously.

Optionally, in the embodiments of the present disclosure, if the SN of each of the at least one AMD PDU is not equal to the first value, the transmission side continues to transmit the detection indication for the multiple AMD PDUs to the receiving side for a duration of the detection retransmission timer.

That is, if the state report received by the transmission side does not carry the SN equal to POLL_SN, the detection retransmission timer will continue to count, and until the detection retransmission timer expires, the transmission side will retransmit the AMD PDUs not fed back to the receiving side according to each AMD PDU in the state report fed back by the receiving side.

Further, when the detection retransmission timer expires, the retransmission of the AMD PDUs not fed back may be: the retransmission of the AMD PDUs not fed back when the transmission buffer is empty, or the PDCP has no data transmission, or the PDCP has data but the PDCP switches from one RLC to another RLC (such as split or duplication scenarios). That is, if the transmission buffer is not empty, or the PDCP has data and the RLC is not switched, the transmission side may retransmit the AMD PDUs that failed to receive according to the state report fed back.

Figure 4:
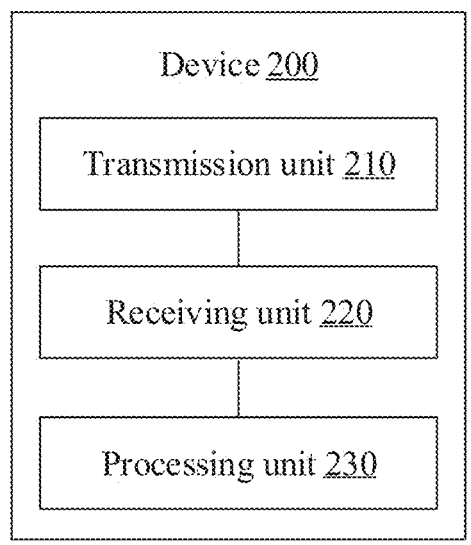
FIG. 4 is a schematic block diagram of a device for retransmission processing according to an embodiment of the present disclosure.

FIG. 4 is a schematic block diagram of a device 200 according to an embodiment of the present disclosure. As illustrated in FIG. 4, the device is a transmission side, and the device 200 includes: a transmission unit 210, a receiving unit 220 and a processing unit 230.

The transmission unit 210 is configured to transmit a detection indication to a receiving side, the detection indication being used to indicate the receiving side to feed back a receiving state of multiple AMD PDUs sent by the transmission side.

The receiving unit 220 is configured to receive a state report sent by the receiving side, the state report being used to indicate a receiving state of at least one AMD PDU in the multiple AMD PDUs.

The processing unit 230 is configured to stop, if an SN of a first AMD PDU of the at least one AMD PDU is equal to a first value, transmitting the detection indication for the multiple AMD PDUs to the receiving side, the first value being less than or equal to a maximum SN in the SNs of the multiple AMD PDUs.

Therefore, the device for retransmission processing of the embodiment of the present disclosure is advantageous in reducing unnecessary overhead.

Optionally, in the embodiments of the present disclosure, a packet header of a second AMD PDU in the multiple AMD PDUs includes the detection indication.

Optionally, in the embodiments of the present disclosure, the first value is equal to the maximum SN, or the first value is equal to an SN of the second AMD PDU.

Optionally, in the embodiments of the present disclosure, the device further includes: a timing unit, configured to start or restart, after the transmission side delivers the second AMD PDU from an RLC layer to an MAC layer, a detection retransmission timer.

Optionally, in the embodiments of the present disclosure, the processing unit is specifically configured to: stop and reset the detection retransmission timer.

Optionally, in the embodiments of the present disclosure, the transmission unit is further configured to: continue, if the SN of each of the at least one AMD PDU is not equal to the first value, to transmit the detection indication for the multiple AMD PDUs to the receiving side for a duration of the detection retransmission timer.

Optionally, in the embodiments of the present disclosure, the device further includes: a retransmission unit, configured to retransmit, when the detection retransmission timer expires, all AMD PDUs not fed back in the multiple AMD PDUs according to the received state report.

Optionally, in the embodiments of the present disclosure, the multiple AMD PDUs are transmitted by a first RLC layer of the transmission side, and the retransmission unit is specifically configured to: retransmit, when a buffer of the first RLC layer is empty, or a PDCP layer of the transmission side has no data transmission, or the PDCP layer has data transmission but the PDCP layer switches from the first RLC layer to a second RLC layer, all AMD PDUs not fed back in the multiple AMD PDUs according to the received state report.

Optionally, in the embodiments of the present disclosure, the device is a terminal device or a network device.

It is to be understood that the device 200 according to the embodiment of the present disclosure may correspond to the transmission side in the method embodiment of the present disclosure, and the foregoing and other operations and/or functions of the respective units in the device 200 are respectively used to implement the corresponding process of the transmission side in the method 200 illustrated in FIG. 2, which will not be described here for brevity.

Figure 5:
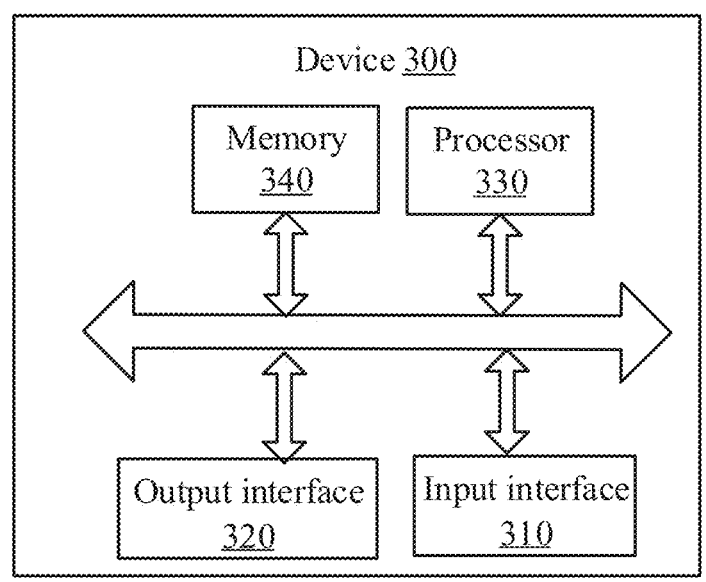
FIG. 5 is another schematic block diagram of a device for retransmission processing according to an embodiment of the present disclosure.

As illustrated in FIG. 5, the embodiment of the present disclosure further provides a device 300. The device 300 may be the device 200 in FIG. 4, which can be configured to perform the content of the transmission side corresponding to the method 200 illustrated in FIG. 2. The device 300 includes: an input interface 310, an output interface 320, a processor 330, and a memory 340, and the input interface 310, the output interface 320, the processor 330, and the memory 340 may be connected by a bus system. The memory 340 is configured to store programs, instructions or codes. The processor 330 is configured to execute the programs, the instructions or the codes in the memory 340, so as to control the input interface 310 to receive a signal, control the output interface 320 to transmit a signal, and complete the operations in the foregoing method embodiment.

Therefore, the device for retransmission processing of the embodiment of the present disclosure is advantageous in reducing unnecessary overhead.

It is to be understood that in the embodiment of the present disclosure, the processor 330 may be a Central Processing Unit (CPU), and the processor 330 may also be other general-purpose processors, digital signal processors, application specific integrated circuits, field programmable gate arrays or other programmable logic devices, discrete gate or transistor logic devices, discrete hardware components, and the like. The general-purpose processor may be a microprocessor, or the processor may be any conventional processor.

The memory 340 may include a Read-Only Memory (ROM) and a Random Access Memory (RAM) and provides instructions and data to the processor 330. A portion of the memory 340 may also include a non-volatile RAM. For example, the memory 340 may also store information of a device type.

In the implementation process, each operation of the above method may be completed by an integrated logic circuit of hardware in the processor 330 or an instruction in the form of software. The operations of the method disclosed in the embodiment of the present disclosure may be directly implemented as a hardware processor, or may be performed by a combination of hardware and software modules in the processor. The software module may be located in a mature storage medium such as a RAM, a flash memory, a ROM, a programmable ROM or an electrically erasable programmable memory, and a register. The storage medium is located in the memory 340, and the processor 330 reads information in the memory 340 and completes the content of the above method in combination with hardware thereof. To avoid repetition, no descriptions will be made herein.

In a specific implementation, the transmission unit in the device 200 may be implemented by the output interface 320 in FIG. 5, the processing unit in the device 200 may be implemented by the processor 330 in FIG. 5, and the receiving unit in the device 200 may be implemented by the input interface 310 in FIG. 5.

Those of ordinary skill in the art will appreciate that the units and algorithm steps of various examples described in combination with the embodiments disclosed herein can be implemented in electronic hardware or a combination of computer software and electronic hardware. Whether these functions are performed in the form of hardware or software depends on specific application and design constraints of the technical solution. A person skilled in the art can use different methods for implementing the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present disclosure, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed may be indirect coupling or communication connection between devices or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the present disclosure may be integrated into one processing unit, or each unit may exist physically separately, or two or more units may be integrated into one unit.

The functions may be stored in a computer-readable storage medium if being implemented in the form of a software functional unit and sold or used as a standalone product. Based on such understanding, the technical solution of the present disclosure, which is essential to the prior art or part of the technical solution, may be embodied in the form of a software product stored in a storage medium, including a plurality of instructions used to cause a computer device (which may be a personal computer, server, or network device, etc.) to perform all or part of the steps described in various embodiments of the present disclosure. The foregoing storage medium includes: various media capable of storing program codes, such as a U disk, a mobile hard disk, a ROM, a RAM, a magnetic disk, or an optical disc.

The foregoing is only a specific implementation of the present disclosure, but the scope of protection of the present disclosure is not limited thereto. Any person skilled in the art can easily think of changes or replacements within the technical scope disclosed in the present disclosure, which should be covered by the scope of protection of the present disclosure. Therefore, the scope of protection of the present disclosure should be determined by the scope of the claims.

What is claimed is:

1. A method for retransmission processing, comprising:
transmitting, by a transmission side, a detection indication to a receiving side, the detection indication being used to indicate the receiving side to feed back a receiving state of a plurality of Acknowledged Mode Data (AMD) Protocol Data Units (PDU) sent by the transmission side;
setting, by the transmission side, a first value to a value equal to a maximum Sequence Number (SN) in SNs of the plurality of AMD PDUs;
receiving, by the transmission side, a state report sent by the receiving side, the state report being used to indicate a receiving state of at least one AMD PDU of the plurality of AMD PDUs; and
responsive to that an SN of a first AMD PDU of the at least one AMD PDU is equal to the first value, stopping, by the transmission side, transmitting the detection indication for the plurality of AMD PDUs to the receiving side;
wherein a packet header of a second AMD PDU of the plurality of AMD PDUs comprises the detection indication, and the method further comprises:
after the transmission side delivers the second AMD PDU from a Radio Link Control (RLC) layer to a Media Access Control (MAC) layer, starting or restarting, by the transmission side, a detection retransmission timer;
wherein the method further comprises:
responsive to that the SN of none of the at least one AMD PDU is equal to the first value, continuing, by the transmission side, to transmit the detection indication for the plurality of AMD PDUs to the receiving side for a duration of the detection retransmission timer.

2. The method of claim 1, wherein stopping, by the transmission side, transmitting the detection indication for the plurality of AMD PDUs to the receiving side comprises:
stopping and resetting, by the transmission side, the detection retransmission timer.

3. The method of claim 1, further comprising:
responsive to the expiry of the detection retransmission timer, retransmitting, by the transmission side, all AMD PDUs, for each of which no state report is fed back, of the plurality of AMD PDUs according to the received state report.

4. The method of claim 3, wherein the AMD PDUs are transmitted by a first RLC layer of the transmission side, and retransmitting, by the transmission side, all AMD PDUs, for each of which no state report is fed back, of the plurality of AMD PDUs comprises:
responsive to that a buffer of the first RLC layer is empty, or a Packet Data Convergence Protocol (PDCP) layer of the transmission side has no data transmission, or the PDCP layer has data transmission but the PDCP layer switches from the first RLC layer to a second RLC layer, retransmitting, by the transmission side, all AMD PDUs, for each of which no state report is fed back, of the plurality of AMD PDUs according to the received state report.

5. The method according to claim 1, wherein the transmission side is a terminal device or a network device.

6. A device for retransmission processing, the device being a transmission side, the device comprising: a first transmitter, configured to transmit a detection indication to a receiving side, the detection indication being used to indicate the receiving side to feed back a receiving state of a plurality of Acknowledged Mode Data (AMD) Protocol Data Units (PDU) sent by the transmission side; a processor, configured to set a first value to a value equal to a maximum Sequence Number (SN) in SNs of the plurality of AMD PDUs; and a receiver, configured to receive a state report sent by the receiving side, the state report being used to indicate a receiving state of at least one AMD PDU of the plurality of AMD PDUs; wherein the processor; is further configured to stop, responsive to that an SN a first AMD PDU of the at least one AMD PDU is equal to the first value, transmitting the detection indication for the plurality of AMD PDUs to the receiving side, wherein a packet header of a second AMD PDU of the plurality of AMD PDUs comprises the detection indication, and the device further comprises: a detection retransmission timer, configured to be started or restarted, after the transmission side delivers the second AMD PDU from a Radio Link Control, RLC, layer to a Media Access Control, MAC, layer;

wherein the first transmitter is further configured to:
        continue, responsive to that the SN of each of the at least one AMD PDU is not equal to the first value, to transmit the detection indication for the plurality of AMD PDUs to the receiving side for a duration of the detection retransmission timer.

7. The device of claim 6, wherein the processor is specifically configured to:
    stop and reset the detection retransmission timer.

8. The device of claim 6, further comprising:
    a second transmitter, configured to retransmit, responsive to the expiry of the detection retransmission timer, all AMD PDUs, for each of which no state report is fed back, of the plurality of AMD PDUs according to the received state report.

9. The device of claim 8, wherein the AMD PDUs are transmitted by a first RLC layer of the transmission side, and the second transmitter is specifically configured to:
    retransmit, responsive to that a buffer of the first RLC layer is empty, or a Packet Data Convergence Protocol (PDCP) layer of the transmission side has no data transmission, or the PDCP layer has data transmission but the PDCP layer switches from the first RLC layer to a second RLC layer, all AMD PDUs, for each of which no state report is fed back, of the plurality of AMD PDUs according to the received state report.

10. The device of claim 6, wherein the device is a terminal device or a network device.

11. A non-transitory storage medium having stored thereon computer-executable instructions that when executed by a processor, cause the processor to perform a method, the method comprising:

transmitting, by a transmission side, a detection indication to a receiving side, the detection indication being used to indicate the receiving side to feed back a receiving state of a plurality of Acknowledged Mode Data (AMD) Protocol Data Units (PDU) sent by the transmission side;
    setting, by the transmission side, a first value to a value equal to a maximum Sequence Number (SN) in SNs of the plurality of AMD PDUs;
    receiving, by the transmission side, a state report sent by the receiving side, the state report being used to indicate a receiving state of at least one AMD PDU of the plurality of AMD PDUs; and
    responsive to that an SN of a first AMD PDU of the at least one AMD PDU is equal to the first value, stopping, by the transmission side, transmitting the detection indication for the plurality of AMD PDUs to the receiving side;
    wherein a packet header of a second AMD PDU of the plurality of AMD PDUs comprises the detection indication, and the method further comprises:
    after the transmission side delivers the second AMD PDU from a Radio Link Control (RLC) layer to a Media Access Control (MAC) layer, starting or restarting, by the transmission side, a detection retransmission timer;
    wherein the method further comprises:
    responsive to that the SN of none of the at least one AMD PDU is equal to the first value, continuing, by the transmission side, to transmit the detection indication for the plurality of AMD PDUs to the receiving side for a duration of the detection retransmission timer.

\* \* \* \* \*